United States Patent [19]

Suzuki

[11] Patent Number: 5,212,602
[45] Date of Patent: May 18, 1993

[54] MAGNETIC HEAD HAVING FUSE WITHIN HEAD CASE

[75] Inventor: Hidefumi Suzuki, Tokyo, Japan

[73] Assignee: Kabushiki Kaisha CSK, Tokyo, Japan

[21] Appl. No.: 689,746

[22] PCT Filed: Sep. 18, 1990

[86] PCT No.: PCT/JP90/01191
§ 371 Date: May 17, 1991
§ 102(e) Date: May 17, 1991

[30] Foreign Application Priority Data
Sep. 18, 1989 [JP] Japan .................................. 1-241457

[51] Int. Cl.$^5$ ............................................... G11B 5/17
[52] U.S. Cl. ..................................... 360/66; 360/110; 360/123
[58] Field of Search .................. 360/60, 66, 110, 123, 360/125, 129

[56] References Cited
U.S. PATENT DOCUMENTS
4,245,268 1/1981 Toshimitsu ..................... 360/125 X
FOREIGN PATENT DOCUMENTS
85604 5/1986 Japan .

Primary Examiner—Paul Gensler
Attorney, Agent, or Firm—Lakenbach Siegel Marzullo & Aronson

[57] ABSTRACT

A magnetic head usable in a reader-writer for reading and writing data which can be magnetically processed. The magnetic head is characterized in that: it comprises a core (1), an exciting coil (2) for exciting the core (1), and a head case (3) for tightly enclosing the core (1) and the exciting coil (2); and a fuse is provided in a part of the exciting coil (2). When the reader-writer in which the magnetic head is incorporated is to be abandoned, the magnetic head can be easily destroyed, thereby enabling the prevention of fraudulent uses, such as the forging, of magnetic cards.

2 Claims, 1 Drawing Sheet

MAGNETIC HEAD HAVING FUSE WITHIN HEAD CASE

TECHNICAL FIELD

The present invention relates to a magnetic head usable in a reader-writer for reading and writing magnetically recorded data from and into a magnetic card, etc.

BACKGROUND ART

In recent years, among magnetic cards for recording information in the form data that can be magnetically processed, an increased number of such cards have come to include in their use, in addition to the reading of data recorded, the rewriting of data during the use of the magnetic card. Magnetic cards of this type are, for example, prepaid cards which allow the remaining units of use, the remaining amount of money, etc. to be rewritten each time the card is used.

Hitherto, data on a magnetic card of this type has been rewritten in the following manner: first, the present data is read, then new data is overwritten on magnetic stripes.

As magnetic cards of this type become popular, however, such false acts as forging or copying data on magnetic cards have come to be conducted.

In view of such acts, the card manufacturers have taken counter measures such as to cover a magnetic card with a magnetism concealing layer so as to prevent stealing, forging, etc. of data on the magnetic card. The fact that it is usually difficult for people in general to obtain a magnetic head capable of writing data in a magnetic card, helps to prevent forging of magnetic cards.

However, because a reader-writer for a magnetic card, which is employed during the use of a magnetic card, has a magnetic head capable of writing data, there is a risk that a magnetic head may be obtained from an abandoned reader-writer or the like, and be used in the forging of magnetic cards.

The present invention is intended to overcome said problem conventionally encountered, and to provide a magnetic head for a reader-writer that is effective for preventing forgery, etc. of data in magnetic cards.

DISCLOSURE OF INVENTION

According to the present invention, there is provided a magnetic head usable in a reader-writer for reading and writing data which can be magnetically processed, the magnetic head is characterized in that: it comprises a core, an exciting coil for exciting the core, and a head case for tightly enclosing the core and the exciting coil; and a fuse is provided in a part of the exciting coil.

By virtue of the above-specified arrangement, when a reader-writer in which the magnetic head is incorporated is to be abandoned, the magnetic head can be easily destroyed, thereby enabling the prevention of fraudulent uses, such as the forging, of magnetic cards.

BEST MODE FOR CARRYING OUT THE INVENTION

Figure 1:
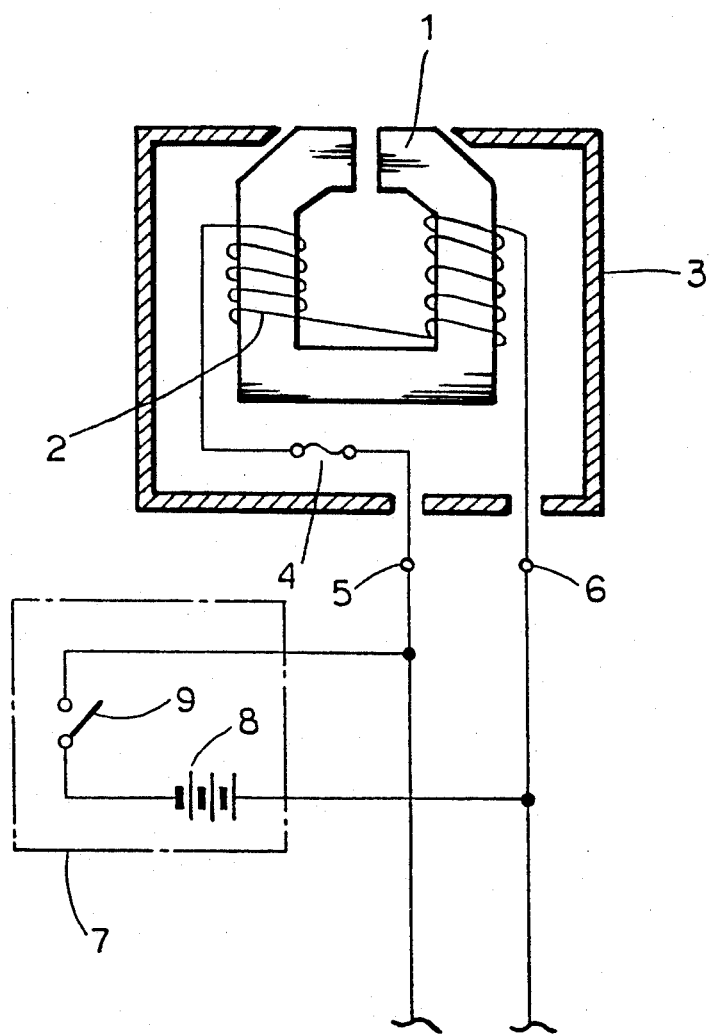
FIG. 1 is a schematic diagram of a magnetic head according to an embodiment of the present invention.

An embodiment of the present invention will now be described with reference to the single drawing.

A magnetic head according to one embodiment of the present invention comprises, as shown in the drawing, a core 1 for generating a magnetic field, an exciting coil 2 for exciting the core 1, and a head case 3 for tightly enclosing the core 1 and the exciting coil 2. Terminals 5 and 6 are provided at two ends of the exciting coil 2 for supplying current, and are exposed to the outside of the head case 3.

A fuse 4 is provided in a part of the exciting coil 2. Therefore, when current of a magnitude above a certain level is applied to the exciting coil 2, the fuse 4 is blown so that no current will flow through the exciting coil 2, thereby making it impossible for the magnetic head to read or write data.

In this case, since the magnetic head according to the present invention is such that the head case 3 tightly encloses the core 1 and the exciting coil 2, it is impossible to recover the function of the exciting coil 2 by accessing the fuse 4 from the outside and replacing it. Thus, once the magnetic head is rendered unusable, it cannot be used again.

The terminals 5 and 6 are connected both to a circuit which supplies a current for operating the magnetic head and to a fuse blowing circuit 7 for causing current of a magnitude greater than the permissible current of the fuse 4 to flow.

The fuse blowing circuit 7 comprises a power source 8 for generating current of a magnitude greater than the permissible current of the fuse 4, and a switch 9. Therefore, when, for instance, fraudulent use of the magnetic head has been detected, or the associated reader-writer is to be abandoned, the fuse 4 can be easily blown to thereby destroy the magnetic head.

What is claimed is:

1. A magnetic head usable in a reader-writer for reading and writing data which can be magnetically processed, the magnetic head being characterized in that:
   it comprises a core, an exciting coil for exciting said core, and a head case for tightly enclosing said core and said exciting coil; and
   a fuse is provided in a part of said exciting coil.

2. A magnetic head according to claim 1, wherein a fuse blowing circuit is connected for causing current of a magnitude greater than the permissible current of said fuse to flow thereto.

* * * * *